Patented June 14, 1949

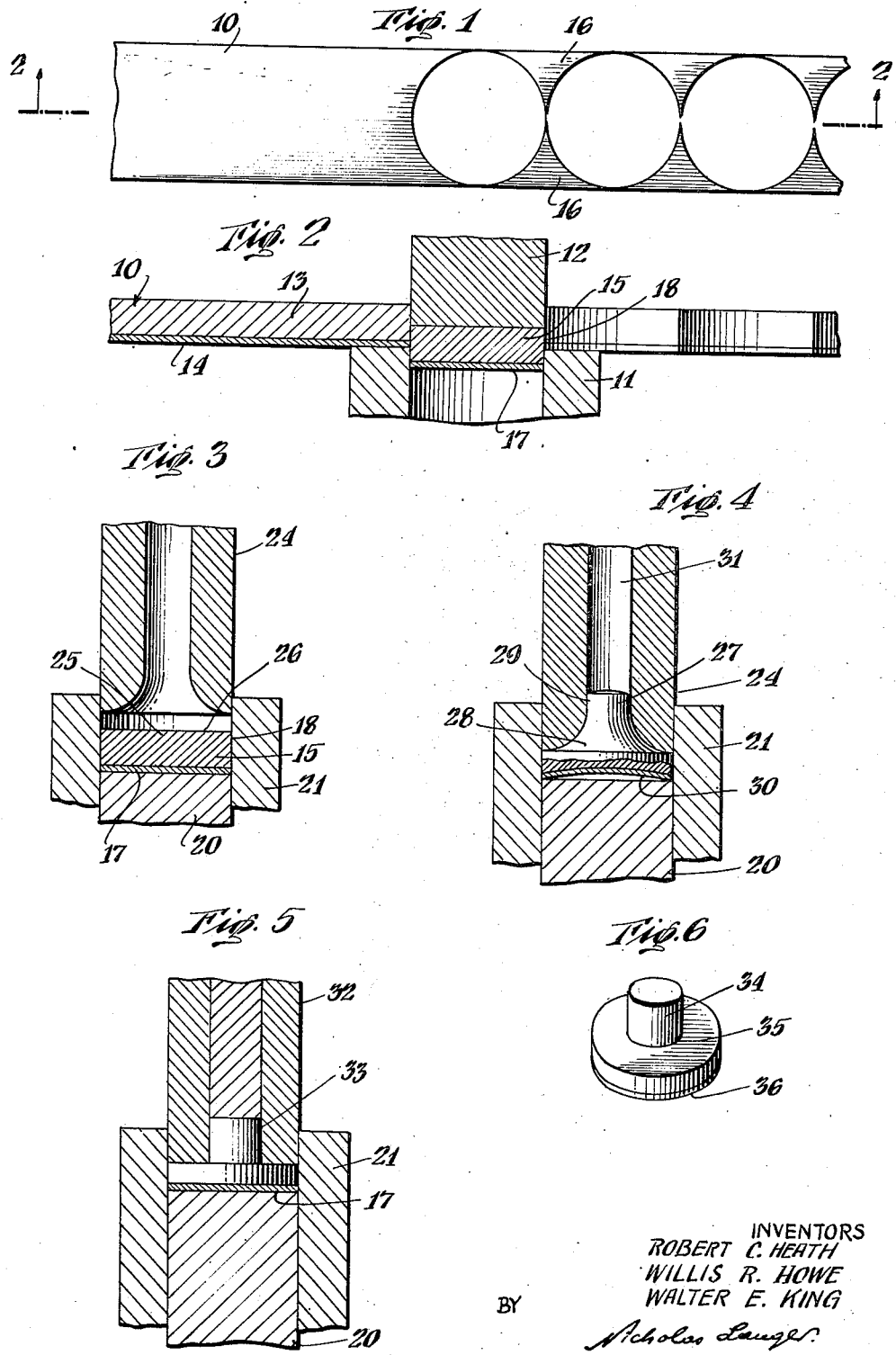

2,473,371

UNITED STATES PATENT OFFICE 2,473,371

METHOD OF MAKING CONTACTS

Robert C. Heath, Willis R. Howe, and Walter E. King, Indianapolis, Ind., assignors to P. R. Mallory & Co., Inc., Indianapolis, Ind., a corporation of Delaware Application December 29, 1945, Serial No. 637,996

8 Claims. (Cl. 29—155.55)

This invention relates to a method of making contacts having an integral shank or projection, commonly known as rivet-type contacts, and particularly to a method of making rivet-type contacts having a precious metal face and a backing of base metal.

An object of this invention is to disclose an improved method of making rivet-type contacts.

Other objects of the invention will be apparent from the following description and accompanying drawings taken in connection with the appended claims.

The invention accordingly comprises methods of manufacture referred to above or which will be brought out and exemplified in the disclosure hereinafter set forth, including the illustrations in the drawings, the scope of the invention being indicated in the appended claims.

In the drawings:

Figures 1 and 2 show the step of forming a contact blank from bimetal strip;

Figure 3 is a view of the blank in position for the first coining operation;

Figure 4 illustrates the formation of an embryo shank during the first coining operation;

Figure 5 shows the formation of the finished contact by a second coining operation; and Figure 6 is a perspective view of the finished contact.

Heretofore, rivet-type contacts having a precious metal face and a base metal backing have oftentimes been made by forming a cylindrical contact blank and then machining the blank to form a shank and finish the contact. However, the machining operation is quite expensive so that the cost of producing contacts by this method is excessive. In other cases, a contact blank has been formed and subjected to a single coining operation to extrude the shank and obtain the final dimensions of the contact. Where the contact is finished by one coining operation, difficulties have been experienced as a result of uneven distribution of the precious metal on the contact face due to the necessity of blanking a slug smaller in diameter than the finished part and then forcing the metal to move to the outer perimeter of a larger die cavity. The pulling effect, caused by squirting the embryo shank, also has a tendency to distort the contact face and even to cause formation of holes in the precious metal face of the contact. These difficulties are accentuated when copper is used for the base metal since copper is relatively difficult to work.

According to this invention, such difficulties are eliminated or greatly minimized by subjecting the contact blank to two coining operations. In the first coining operation, an elongated embryo shank is extruded having an enlarged base portion adjacent the rear face of the blank. In this manner, the pulling effect is greatly minimized since the extruded metal flows from both the peripheral and central regions of the blank rather than from the central regions alone as is the case when the shank is formed by one operation. During the second coining operation, pressure is applied to the elongated embryo shank and the enlarged base portion thus forcing the metal to flow toward the contact face to finish the shank and finally dimension the contact. In this step, the precious metal face is pressed against the face of the lower punch so that any slight distortion of the contact face caused by extrusion of the embryo shank is eliminated. Thus, a smooth contact face is obtained having a uniform layer of precious metal thereon even when copper is used as the base metal. The described method is very economical since the contacts may be formed from bimetallic strip having a width substantially equal to the diameter of the contact whereby the amount of waste material is decreased.

While a preferred embodiment of the invention is described herein, it is contemplated that considerable variation may be made in the method of procedure without departing from the spirit of the invention. In the following description and in the claims, the method steps will be identified by specific names for convenience, but they are intended to be as generic in their application as the art will permit.

Referring now to the drawings in detail, the contact blanks may be formed from a strip 10 of bimetallic material intermittently fed over a die sleeve 11 which cooperates with a blanking punch 12. The bimetallic strip may consist of a relatively thick layer 13 of base metal and a relatively thin layer 14 of precious metal. The base metal may be copper or any other suitable material, copper being preferable because of its excellent conducting properties. The precious metal utilized may be platinum, platinum-iridium, or any other suitable wear-resistant material. As the strip moves intermittently along the die, the punch 12 operates to produce a circular blank 15 having the same diameter as the finished contact but of considerably greater width, said blank having a precious metal face 17 and a relatively wide backing 18 of base metal. When the contact blank is originally of the same diameter as the finished contact, there is no tendency for the base metal to flow around the edges of the precious metal face in the succeeding coining operations which is advantageous in obtaining a uniformly distributed face of precious metal on the finished contact. It is a feature of the invention that the contact blanks are formed from bimetallic strip having a width substantially equal to the diameter of the contact with the result that the only materials wasted are the small pieces 16 at the opposite sides of the strip.

In order to effect the extrusion of an embryo shank by a first coining operation, the blank 15 is positioned upon a lower punch 20 which acts in a die sleeve 21 with the precious metal face 17 resting on the lower punch and the entire blank contained within the die sleeve. A bell-mounted coining punch 24 is then forced into engagement with the base metal with the result that the material flows inwardly and upwardly from both the central regions 25 and the peripheral regions 26 of the blank into the hollow interior of the punch 24. In this manner, an elongated embryo shank 27 is formed having an enlarged fillet-shaped base portion 28 which merges into a generally cylindrical end portion 29. It will be understood the pulling effect caused by extrusion of the embryo shank is small since the metal for the shank is taken from both the central regions 25 and the peripheral regions 26. Thus, the pulling effect is exerted upon a comparatively large area rather than being confined to the central region 25 and while some distortion of the contact face may occur, as indicated by the concave surface 30, this distortion is not severe enough to result in uneven distribution of the precious metal over the contact face nor to cause formation of holes in the precious metal. It will be noted that the interior passage 31 in the punch 24 is of smaller diameter than the finished shank and that the flow of metal into this passage is unrestricted. Accordingly, the embryo shank is somewhat longer than the finished shank which is of advantage in finishing the shank as will be hereinafter explained.

In the second coining operation, the contact blank, which may still be positioned on the lower punch 20, is acted upon by a punch 32, the interior portion 33 of which conforms to the size and shape of the finished contact. In this manner, the embryo shank is finished and the contact is finally dimensioned. As the punch 32 moves toward the lower punch, the enlarged base portion and the end portion of the elongated embryo shank are compressed with the result that the metal is forced toward the lower punch rather than away from the lower punch as in the first coining operation. Consequently, the precious metal face of the blank is pressed against the lower punch with resultant flattening of the deformed or concave surface 30. In this manner, a smooth contact face is obtained and the precious metal is evenly distributed thereover.

In the finished contact, the shank 34 and the base metal backing 35 are accurately dimensioned by the punch 32. There is no tendency for the base metal to flow around the edges of the face 36 during the coining operations since the contact is originally blanked to its final diameter and, as previously stated, the pulling effect on the face caused by extrusion of the embryo shank is minimized by utilizing a bell-mouthed forming tool. Accordingly, after the contact face is pressed against the die in the second coining operation, the thickness of the original precious metal layer is substantially the same as in the original bimetal strip even when a metal such as copper is used as the base metal.

It will be apparent from the foregoing description that the principles of this invention may be applied to making rivet-type contacts of square or irregular shape as well as circular contacts. In addition, any type of integral projection may be formed on a contact blank so that the invention is not to be restricted to contacts having an integral shank for supporting the contact. While the present invention as to its objects and advantages, has been described herein as carried out in specific embodiments thereof, it is not desired to be limited thereby but it is intended to cover the invention broadly within the spirit and scope of the appended claims.

What is claimed as new and desired to be secured by Letters Patent is:

1. A method for making a contact having a precious metal face and a backing of base metal which comprises forming a blank from bimetallic strip material, forcing base metal to flow inwardly and upwardly from the central and peripheral regions of the blank to form an embryo shank whereby the material adjacent the face is forced inwardly to form an uneven contact surface, and applying pressure to the blank and the embryo shank to re-form the contact blank to final dimensions and finish the shank, said pressure being effective to flatten the surface of the contact face.

2. A method for making a contact having a precious metal face which comprises forming a blank from bimetallic strip material, coining said blank to extrude an elongated embryo shank having an enlarged fillet-shaped base portion adjacent the rear face of the contact blank merging into a cylindrical end portion whereby the face of the blank assumes a generally concave configuration, and applying coining pressure to re-form the contact to final dimensions and finish the shank, said coining pressure being effective to flatten the concave surface of the contact face.

3. A method for making a contact having a precious metal face which comprises positioning the face of a bimetallic contact blank upon a die, applying a hollow bell-mouthed forming tool to the rear of said blank to extrude an embryo shank, the metal flowing from both the central and peripheral regions of the blank into the hollow interior portions of said forming tool, and pressing a second forming tool against the embryo shank and the rear of said blank to form a finished contact, the face of the contact being forced against the die by the second forming tool whereby a flat contact surface of precious metal is obtained.

4. A method for making a contact having a precious metal face which comprises forming a blank from bimetallic strip material, coining said blank to extrude an elongated embryo shank having an enlarged fillet-shaped base portion adjacent the rear face of the contact blank merging into a cylindrical end portion whereby the face of the contact assumes a generally concave configuration, and applying coining pressure to the elongated shank and the fillet-shaped base portion to force the metal toward the contact face whereby the contact is re-formed to final dimensions and the shank is finished, said coining pressure being effective to flatten the concave surface of the contact face.

5. A method for making a contact having a precious metal face which comprises positioning the face of a bimetallic contact blank upon a die, applying a hollow bell-mouthed forming tool to the rear of said blank to extrude an embryo shank having an enlarged base portion adjacent the rear face of the contact blank merging into a cylindrical end portion, the metal flowing from both the central and peripheral regions of the blank to the interior of said forming tool whereby the metal adjacent the face of the blank flows away from the die to form a concave surface, and pressing a second forming tool against the embryo shank and the rear of said blank to form a finished contact, the face of the contact being forced against the die by the second forming tool whereby a flat contact surface of precious metal is obtained.

6. A method for making a contact having a precious metal face which comprises positioning the face of a bimetallic contact blank upon a die, applying a hollow bell-mouthed forming tool to the rear of said blank to extrude an embryo shank having an enlarged fillet-shaped base portion adjacent the rear face of the contact blank merging into a cylindrical end portion, the metal flowing from both the central and peripheral regions of blank into the interior of said forming tool whereby the metal adjacent said contact face flows away from the die, and pressing a second forming tool against the elongated embryo shank, the fillet-shaped portion, and the rear of the blank to cause the metal to flow toward the die and form a finished contact having a flat face formed of precious metal.

7. A method of forming a metallic body having an elongated cylindrical shank protruding from a negligibly stressed cylindrical body of relatively large diameter comprising a first step of applying pressure on the peripheral regions of a cylindrical metal blank thereby forcing material to flow from both the central and peripheral regions of said blank inwardly and in a direction opposite to that of pressure application to form a contact head with a slightly uneven contact surface opposite said shank and an elongated unfinished shank having a curved longitudinal contour diminishing toward its free end, and a second step of applying pressure to the blank and the unfinished shank to re-form the contact blank to final dimensions and finish the shank, the pressure applied to said shank being directed toward the head of the contact also to straighten said uneven contact surface.

8. A method for making a contact which comprises forming a blank from metallic strip material, forcing metal to flow inwardly and upwardly from the central and peripheral regions of the blank to form an embryo shank whereby the material adjacent the face and opposite the embryo shank is forced inwardly to form an uneven contact surface, and applying pressure to the blank and the embryo shank to re-form the contact blank to final dimensions and finish the shank, said pressure being effective to flatten the surface of the contact face.

ROBERT C. HEATH.
W. R. HOWE.
W. E. KING.

REFERENCES CITED

The following references are of record in the file of this patent:

UNITED STATES PATENTS

| Number | Name | Date |
| --- | --- | --- |
| 1,545,364 | Thoma et al. | July 7, 1925 |
| 2,002,641 | McBride | May 28, 1935 |
| 2,169,894 | Criley | Aug. 15, 1939 |
| 2,181,083 | Payette | Nov. 21, 1939 |

FOREIGN PATENTS

| Number | Country | Date |
| --- | --- | --- |
| 336,803 | Great Britain | Oct. 23, 1930 |